April 21, 1925.  
W. H. SELLEW ET AL  
PORTABLE FOOD CONTAINER  
Filed April 1, 1920  
1,534,087  
2 Sheets-Sheet 1
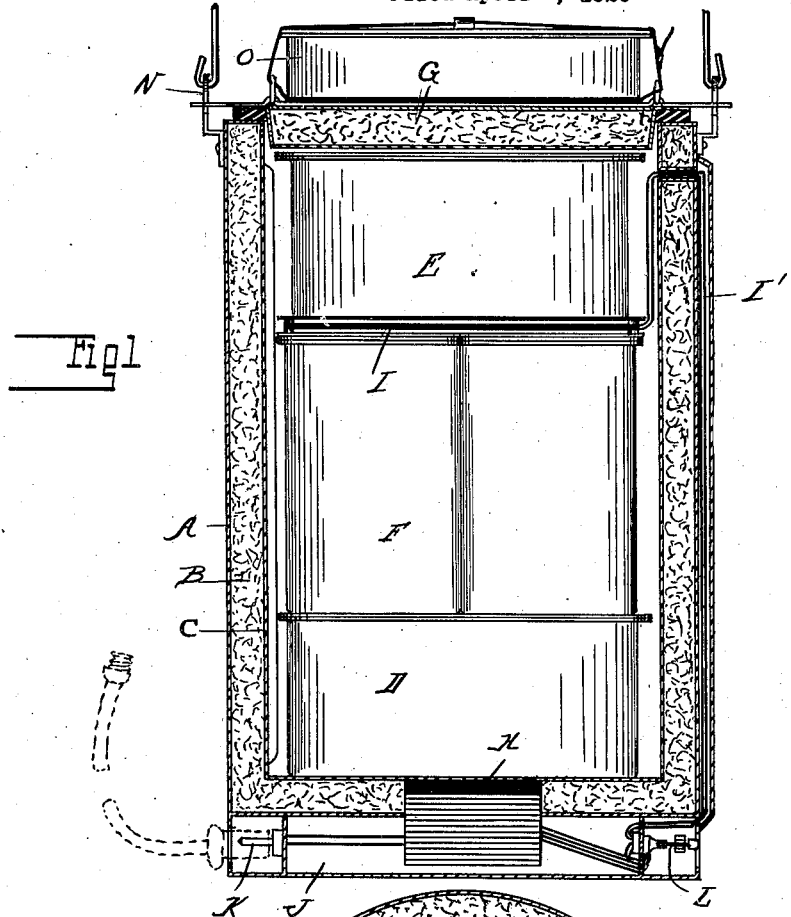
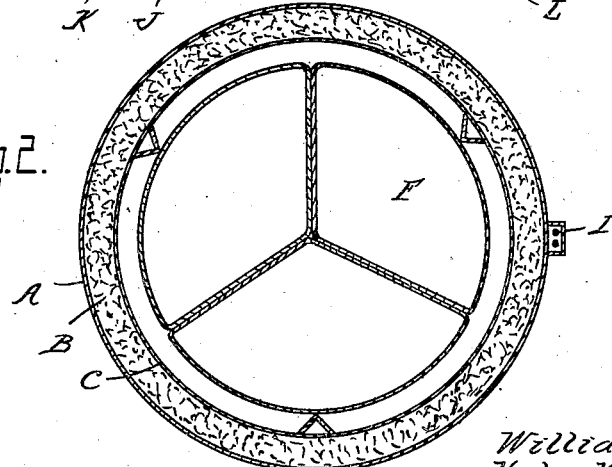
Inventors  
William H. Sellew  
Helen W. Sellew  
By Whittemore Hulbert & Whittemore  
Attorneys

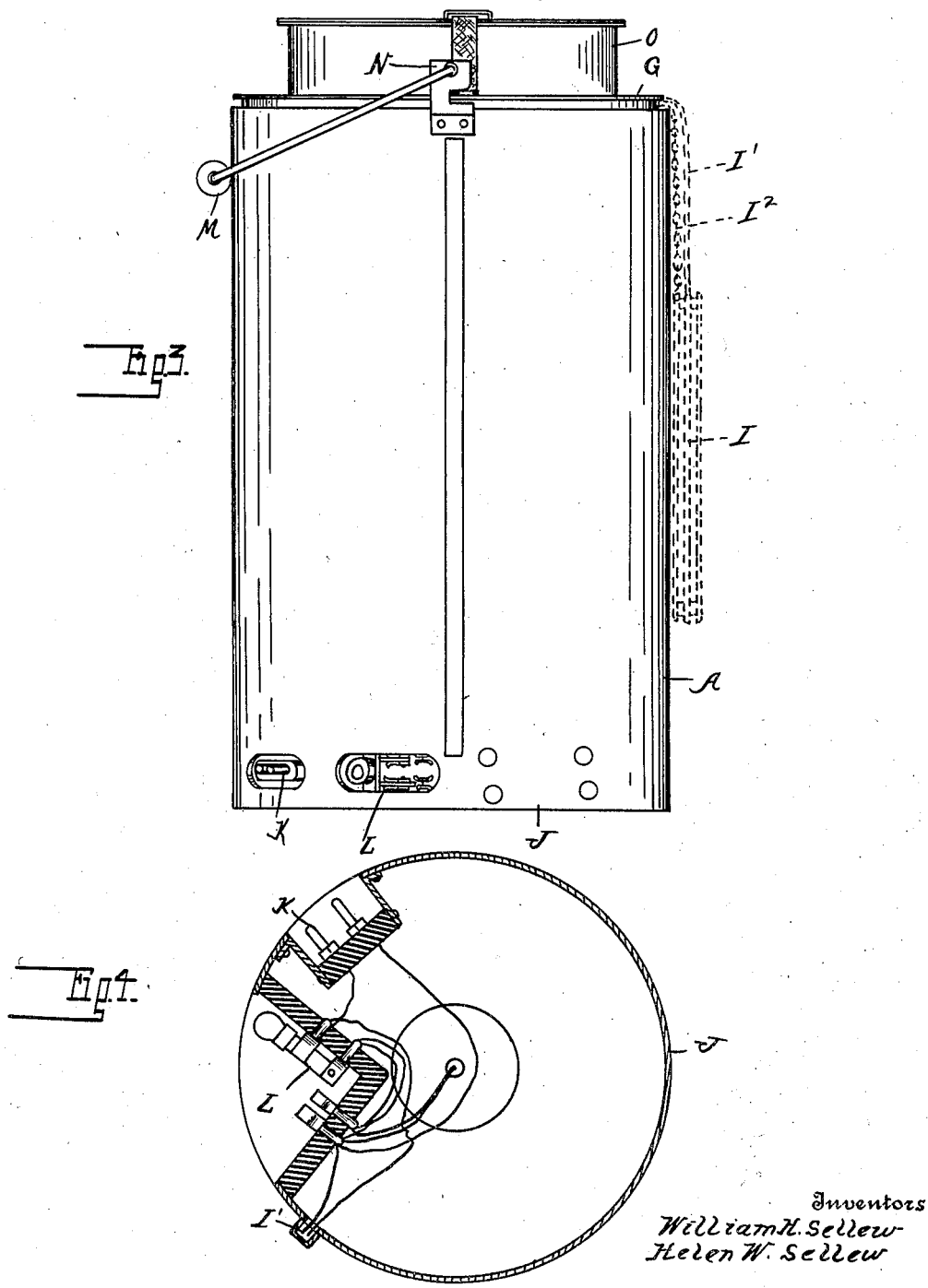

Patented Apr. 21, 1925.

1,534,087

UNITED STATES PATENT OFFICE.

WILLIAM H. SELLEW AND HELEN W. SELLEW, OF ANN ARBOR, MICHIGAN, ASSIGNORS OF ONE-HALF TO ALFRED T. HOPKINS, OF DETROIT, MICHIGAN.

PORTABLE FOOD CONTAINER.

Application filed April 1, 1920. Serial No. 370,372.

*To all whom it may concern:*

Be it known that we, WILLIAM H. SELLEW and HELEN W. SELLEW, both citizens of the United States of America, both residing at Ann Arbor, in the county of Washtenaw and State of Michigan, have invented certain new and useful Improvements in Portable Food Containers, of which the following is a specification, reference being had therein to the accompanying drawings.

The invention relates to electrically heated portable food containers more particularly designed for use in connection with central kitchens and for the purpose of transporting cooked food from the kitchen to the different points of consumption and having it in good condition when served. It is the object of the invention to provide a light compact container having a plurality of compartments therein for the reception of different articles of food and also provided with suitable heat insulation to retard the loss of heat in the interval between leaving the kitchen and where it is served, together with electrical means for restoring the heat lost so that the food may be served in as hot and palatable condition as if directly taken from the stove.

In the drawings:

Figure 1 is a longitudinal section through the portable container;

Figure 2 is a horizontal section thereof;

Figure 3 is a side elevation;

Figure 4 is a horizontal section in a different plane from that of Figure 2.

A is an outer casing, formed of metal or other suitable material, within which is arranged a heat insulating liner B, preferably formed of mineral wool, or other good insulator. C is a lining formed of metal or other suitable material for the insulator B, and F are vessels removably placed within the container and preferably of segmental form, so that a plurality of said vessels may be arranged within the area. E and D are other vessels arranged respectively above and below the vessels F and designed for holding different articles of the cooked food. G is a heat insulated cover for closing the upper end of the container.

To provide means for supplying heat to the food while in the container, one or more electrical heating units are arranged within the container and provided with terminal connections for engagement with an ordinary electrical connector plug. As shown, one heating element H is arranged in the bottom of the container and a second element I is arranged at a higher point, preferably in between the vessels E and F. These units are preferably arranged so that they may develop either low heat for maintaining a moderate temperature if it is necessary to keep the food in the container for a considerable time, or higher heat to quickly raise the temperature of the food preparatory to serving. The electrical connections are preferably arranged in a chamber J in the base of the receptacle and the terminal contacts K are in a socket or recess in said base. There is also provided a switch L in another recess for changing from the low to the high heat. The upper unit I being placed between the receptacles D and F is attached to the container A by a flexible connector I', which permits it to be swung out of the way when the container is being loaded or unloaded. A chain $I^2$ serves to take the mechanical stresses and relieve the same from the connector I'.

To facilitate carrying the container, it is preferably provided with a bail-handle M and the cover G is suitably locked in position, as by the catches N. Also, there is provision on the top of the cover for attachment thereto of a receptacle O for the carrying of food which is to be served cold.

With the construction as described, in use, the hot food as it is taken from the stove in the central kitchen is placed immediately in the receptacles D, E, F, etc. and the container A is then closed by the cover G so as to prevent loss of heat. The container may then be transported to the place where the food is to be served; but before serving, the heat lost is restored, this being quickly accomplished by plugging in an electrical connection and generating the required heat in the units H and I. If considerable time is to elapse before serving the food, the switch L may be adjusted for the low heat, which is sufficient to substantially equal heat losses by radiation and just before the food is to be served the switch is turned to high heat to quickly raise the temperature.

The inner receptacles are spaced from the walls of the container to prevent loss of heat by conduction and to permit circulation of air within the container. This circulation distributes the heat from the units by convection and there results therefrom a more uniform temperature within the container than would be practicable to obtain by conduction alone.

What we claim as our invention is:

1. The combination with a plurality of receptacles containing hot cooked food, of a portable container for the transportation of said receptacles, comprising an outer casing having a removable cover and heating insulation for said casing, and cover means for holding said receptacles within said container so as to form a surrounding air space, an electric heating unit arranged at the base of said container, a second unit arranged at a higher point within said container and provided with a flexible connection permitting of the removal thereof during loading and unloading, and electric connections by which said units may be drawn into circuit while the container is closed for heating the cooked food preliminary to serving.

2. The combination with a plurality of receptacles containing hot cooked food, of a portable container for the transportation of said receptacles, comprising an outer casing having a removable cover, heat insulation for said casing and for said cover, an electric heater in said container for supplying heat lost in transit, and means without said container attached thereto for the carrying of cold food.

In testimony whereof we affix our signatures.

WILLIAM H. SELLEW.
HELEN W. SELLEW.